US012692952B2

(12) United States Patent
Basta

(10) Patent No.: US 12,692,952 B2
(45) Date of Patent: Jul. 28, 2026

(54) VALVE FOR AIRBAG DECELERATOR

(71) Applicant: World View Enterprises Inc., Tucson, AZ (US)

(72) Inventor: Timothy James Basta, Tucson, AZ (US)

(73) Assignee: World View Enterprises Inc., Tucson, AZ (US)

( * ) Notice: Subject to any disclaimer, the term of this patent is extended or adjusted under 35 U.S.C. 154(b) by 0 days.

(21) Appl. No.: 18/115,656

(22) Filed: Feb. 28, 2023

(65) Prior Publication Data

US 2024/0288082 A1     Aug. 29, 2024

(51) Int. Cl.
*F16K 15/02*          (2006.01)
*B64B 1/44*           (2006.01)
(Continued)

(52) U.S. Cl.
CPC .............. *F16K 15/028* (2013.01); *B64B 1/44* (2013.01); *B64D 1/14* (2013.01); *F16K 15/063* (2013.01);
(Continued)

(58) Field of Classification Search
CPC ............ B64D 1/14; F16K 15/028; B64B 1/64
See application file for complete search history.

(56) References Cited

U.S. PATENT DOCUMENTS 1,091,895 A     3/1914  Schaaf
1,278,133 A  *  9/1918  Gammeter ................ B64B 1/64
                                                            137/859

(Continued)

FOREIGN PATENT DOCUMENTS

CN          2844003       12/2006
CN       200988579       12/2007
(Continued)

OTHER PUBLICATIONS

Aerospace-Technology.com: "World View Successfully Completes Test Flight for Commercial Balloon Flights," Aerospace-Technology. com, online article dated Oct. 27, 2015. http://www.aerospace-technology.com/news/newsworld-view-test-flights-commercial-balloon-flight-4702892.

(Continued)

*Primary Examiner* — Joseph W Sanderson
(74) *Attorney, Agent, or Firm* — Knobbe, Martens, Olson & Bear, LLP

(57)                 ABSTRACT

Systems and devices for deceleration of vehicles, such as parafoils descending from high altitude balloons, upon impact with ground. A valve may be configured to release air from within an airbag upon impact of the airbag with ground. The valve may be a one way check valve. The valve may include an axially moveable valve body biased by a spring. An increase in pressure within the airbag due to ground impact overcomes the spring biasing force to move the valve body and release air from the airbag. The released air provides a controlled deceleration due to increased absorption of the impact forces by the deflating airbag. Portions of the valve may be additively manufactured. A valve housing may include flanges that clamp onto the airbag envelope. The valve may be low cost and single use, such that the valve is replaced with a new valve for the next flight.

24 Claims, 4 Drawing Sheets

(51) Int. Cl.
    *B64D 1/14*         (2006.01)
    *F16K 15/06*       (2006.01)
    *F16K 27/02*       (2006.01)
    *B33Y 80/00*       (2015.01)

(52) U.S. Cl.
    CPC ........... *F16K 27/0209* (2013.01); *B33Y 80/00* (2014.12); *F16K 2200/3053* (2021.08)

(56) References Cited

U.S. PATENT DOCUMENTS

| | | | |
|---|---|---|---|
| 1,308,033 A | | 7/1919 | Benton |
| 1,330,329 A | * | 2/1920 | Maxwell ............... F16K 15/065 |
| | | | 137/81.1 |
| 1,384,268 A | * | 7/1921 | Maranville ............... B64B 1/64 |
| | | | 137/531 |
| 1,399,791 A | * | 12/1921 | Pierson .................... B64B 1/64 |
| | | | 137/535 |
| 1,475,304 A | * | 11/1923 | Kraft ......................... B64B 1/64 |
| | | | 244/98 |
| 1,532,396 A | * | 4/1925 | Gammeter ................ B64B 1/64 |
| | | | 137/551 |
| 1,705,854 A | | 3/1929 | Coughlin |
| 1,829,561 A | | 10/1931 | Knight |
| 1,915,342 A | * | 6/1933 | Weidner .................... B64B 1/64 |
| | | | 251/321 |
| 2,020,526 A | * | 11/1935 | Stahl ......................... B64B 1/60 |
| | | | 340/626 |
| 2,069,783 A | * | 2/1937 | Stevens .................... B64B 1/64 |
| | | | 92/37 |
| 2,083,743 A | | 6/1937 | Poole |
| 2,128,266 A | * | 8/1938 | Quinn ....................... B64B 1/64 |
| | | | 137/499 |
| 2,706,605 A | * | 4/1955 | Rose ........................ B64D 1/14 |
| | | | 244/138 R |
| 2,712,913 A | * | 7/1955 | Stanley .................... B64D 1/14 |
| | | | 89/36.01 |
| 2,949,263 A | | 8/1960 | Steinthal |
| 3,141,640 A | | 7/1964 | Sutliff et al. |
| 3,217,736 A | * | 11/1965 | Voss ...................... F16K 15/028 |
| | | | 137/343 |
| 3,862,751 A | * | 1/1975 | Schwaller ................. F16F 3/04 |
| | | | 267/179 |
| 4,205,811 A | * | 6/1980 | Palm ........................ B64D 1/14 |
| | | | 188/266 |
| 4,688,758 A | * | 8/1987 | Crosby, Jr. ................ B64B 1/64 |
| | | | 251/129.05 |
| 4,865,274 A | | 9/1989 | Fisher |
| 5,005,785 A | * | 4/1991 | Puskas ................. B64D 17/025 |
| | | | 244/152 |
| 5,028,018 A | | 7/1991 | Krebber |
| 5,217,186 A | | 6/1993 | Stewart et al. |
| 5,232,184 A | | 8/1993 | Reuter |
| 5,244,169 A | | 9/1993 | Brown et al. |
| 5,362,017 A | | 11/1994 | Puckett |
| 5,620,153 A | | 4/1997 | Ginsberg |
| 5,718,399 A | | 2/1998 | Cheng |
| 5,893,536 A | | 4/1999 | Lee et al. |
| 5,992,794 A | * | 11/1999 | Rotman .................. B64C 25/56 |
| | | | 244/17.17 |
| 6,220,547 B1 | | 4/2001 | Smith et al. |
| 6,364,251 B1 | | 4/2002 | Yim |
| 6,565,042 B1 | | 5/2003 | Yamada |
| 6,626,400 B1 | | 9/2003 | Booth |
| 6,705,572 B1 | | 3/2004 | Christopher |
| 7,096,884 B2 | * | 8/2006 | Mackal ................. F16K 15/028 |
| | | | 137/540 |
| 7,416,158 B2 | | 8/2008 | Sadeck |
| 7,513,481 B2 | * | 4/2009 | Su ........................... B65D 31/14 |
| | | | 206/524.8 |
| 7,954,752 B2 | * | 6/2011 | Smith .................... B64D 25/18 |
| | | | 244/100 A |
| 7,980,266 B2 | * | 7/2011 | Niedermair ........... F16K 15/028 |
| | | | 137/516.17 |

| | | | |
|---|---|---|---|
| 8,104,718 B2 | | 1/2012 | Shaw |
| 8,118,262 B2 | | 2/2012 | Jameson |
| 8,220,751 B1 | | 7/2012 | Berland |
| 8,376,279 B2 | | 2/2013 | Parks et al. |
| 8,448,898 B1 | | 5/2013 | Frolov et al. |
| 8,870,115 B2 | * | 10/2014 | Lu ........................... B64C 25/56 |
| | | | 244/100 R |
| 9,033,281 B1 | | 5/2015 | Adams |
| 9,091,378 B2 | * | 7/2015 | Chuang .................. F16L 29/00 |
| 9,139,279 B2 | | 9/2015 | Heppe |
| 9,506,576 B2 | | 11/2016 | Desai |
| 9,540,091 B1 | | 1/2017 | MacCallum et al. |
| 9,561,858 B2 | | 2/2017 | Leidich et al. |
| 9,658,618 B1 | | 5/2017 | Knoblach et al. |
| 9,694,910 B2 | | 7/2017 | MacCallum et al. |
| 9,868,537 B2 | | 1/2018 | Leidich et al. |
| 10,124,875 B1 | | 11/2018 | Farley et al. |
| 10,279,902 B2 | | 5/2019 | Childress et al. |
| 10,336,432 B1 | | 7/2019 | Farley et al. |
| 10,670,156 B2 | * | 6/2020 | McLean ................ F16K 15/063 |
| 10,781,929 B2 | * | 9/2020 | Konantambigi ...... F16K 15/063 |
| 10,787,268 B2 | | 9/2020 | Leidich et al. |
| 10,988,227 B2 | | 4/2021 | MacCallum et al. |
| 11,072,410 B1 | * | 7/2021 | MacCallum ............. B64B 1/62 |
| 11,084,564 B1 | * | 8/2021 | Farley ..................... B64D 1/12 |
| 11,097,843 B1 | | 8/2021 | MacCallum |
| 11,242,849 B1 | * | 2/2022 | Smith ..................... F04B 1/053 |
| 11,306,839 B1 | * | 4/2022 | Anderson ............. F16K 15/028 |
| 11,325,266 B1 | | 5/2022 | Rodgers et al. |
| 11,338,896 B2 | * | 5/2022 | MacCallum ............. B64D 1/12 |
| 11,548,606 B2 | * | 1/2023 | MacCallum ............. B64B 1/64 |
| 11,560,210 B2 | * | 1/2023 | MacCallum ............. B64D 1/12 |
| 11,608,181 B2 | | 3/2023 | Leidich et al. |
| 11,753,136 B2 | * | 9/2023 | MacCallum ............. B64B 1/62 |
| | | | 244/31 |
| 11,780,552 B2 | * | 10/2023 | MacCallum ............. B64B 1/44 |
| | | | 244/31 |
| 11,804,633 B2 | * | 10/2023 | Zbiral ..................... F16K 15/14 |
| 11,878,784 B2 | * | 1/2024 | Farley ................... B64D 11/00 |
| 2005/0040290 A1 | | 2/2005 | Suhami |
| 2005/0115616 A1 | * | 6/2005 | Mackal ................. F16K 15/028 |
| | | | 137/540 |
| 2007/0095403 A1 | * | 5/2007 | Su ........................... B65D 31/14 |
| | | | 137/512.15 |
| 2008/0017754 A1 | * | 1/2008 | Taylor ................... B60R 21/239 |
| | | | 244/100 A |
| 2008/0185055 A1 | * | 8/2008 | Niedermair ........... F16K 15/028 |
| | | | 137/540 |
| 2009/0134277 A1 | | 5/2009 | Kim et al. |
| 2010/0044507 A1 | * | 2/2010 | Smith .................... B64D 25/18 |
| | | | 244/110 R |
| 2011/0220764 A1 | | 9/2011 | Suh |
| 2011/0240800 A1 | * | 10/2011 | Fox, Jr. ................... B64D 1/14 |
| | | | 244/137.1 |
| 2013/0032665 A1 | * | 2/2013 | Lu ........................... B64C 25/56 |
| | | | 244/100 A |
| 2015/0000771 A1 | * | 1/2015 | Chuang .................. F16L 29/00 |
| | | | 137/535 |
| 2016/0018823 A1 | | 1/2016 | Longmier et al. |
| 2016/0052614 A1 | | 2/2016 | Longmier et al. |
| 2016/0264248 A1 | * | 9/2016 | MacCallum ......... B64D 17/26 |
| 2016/0297537 A1 | * | 10/2016 | MacCallum ......... B64D 17/025 |
| 2017/0331177 A1 | | 11/2017 | MacCallum et al. |
| 2019/0226593 A1 | * | 7/2019 | Konantambigi ........ F16K 15/20 |
| 2019/0383407 A1 | * | 12/2019 | McKean PE ......... F16K 15/063 |
| 2021/0048113 A1 | | 2/2021 | Trulear et al. |
| 2021/0070456 A1 | * | 3/2021 | Leidich ............... B64D 17/025 |
| 2021/0237841 A1 | * | 8/2021 | Farley ..................... B64D 1/12 |
| 2021/0237842 A1 | * | 8/2021 | MacCallum ............. B64B 1/64 |
| 2021/0237874 A1 | * | 8/2021 | MacCallum .......... B64D 17/18 |
| 2021/0245857 A1 | * | 8/2021 | MacCallum .......... B64D 11/00 |
| 2021/0278002 A1 | | 9/2021 | Turner et al. |
| 2021/0320375 A1 | * | 10/2021 | Zbiral ................. H01M 50/308 |
| 2021/0323650 A1 | * | 10/2021 | MacCallum .......... B64D 11/00 |
| 2021/0331778 A1 | * | 10/2021 | Farley ..................... B64B 1/44 |
| 2021/0347461 A1 | | 11/2021 | MacCallum |
| 2022/0154850 A1 | | 5/2022 | Birkelund |
| 2022/0186850 A1 | | 6/2022 | Iversen |

(56) References Cited

U.S. PATENT DOCUMENTS

| | | | | |
|---|---|---|---|---|
| 2022/0242546 A1* | 8/2022 | MacCallum | | B64D 1/12 |
| 2023/0115875 A1* | 4/2023 | MacCallum | | B64B 1/64 |
| | | | | 244/32 |
| 2023/0132269 A1* | 4/2023 | MacCallum | | B64B 1/64 |
| | | | | 244/31 |
| 2023/0365245 A1* | 11/2023 | MacCallum | | B64D 17/18 |
| 2023/0415880 A1* | 12/2023 | MacCallum | | B64D 17/18 |
| 2024/0051669 A1* | 2/2024 | Leidich | | B64D 17/40 |
| 2024/0116622 A1* | 4/2024 | Farley | | B64B 1/64 |
| 2024/0404916 A1* | 12/2024 | Joshua | | H05K 7/20327 |

FOREIGN PATENT DOCUMENTS

| | | | | |
|---|---|---|---|---|
| CN | 202765296 | 3/2013 | | |
| CN | 209671683 | 11/2019 | | |
| CN | 210106704 | 2/2020 | | |
| CN | 112610751 | 6/2022 | | |
| DE | 38 05 645 | 7/1988 | | |
| DE | 39 27 297 | 2/1991 | | |
| DE | 19634017 | 2/1998 | | |
| DE | 10313094 A1 * | 10/2004 | | F16K 15/063 |
| EP | 3 268 279 | 1/2018 | | |
| EP | 3 483 488 | 5/2019 | | |
| FR | 2 724 909 | 3/1996 | | |
| GB | 191207587 | 9/1912 | | |
| GB | 191504525 A * | 1/1916 | | B64B 1/64 |
| GB | 2184699 | 7/1987 | | |
| KR | 10-1699797 | 2/2017 | | |
| RU | 2 112 709 | 6/1998 | | |
| WO | WO 2005/012086 | 2/2005 | | |
| WO | WO 2009/129642 | 10/2009 | | |
| WO | WO 2016/145130 | 9/2016 | | |
| WO | WO 2017/180780 | 10/2017 | | |
| WO | WO 2018/204826 | 11/2018 | | |
| WO | WO 2021/158569 | 8/2021 | | |

OTHER PUBLICATIONS

ALJAZEERA America: "Space tourism company breaks record with high-altitude balloon flight", online article dated Jun. 25, 2014. http://america.aljazeera.com/articles/2014/6/25/balloonspace-tourism.html.

Benton, J. et al.: "On Development of Autonomous HAHO Parafoil System for Targeted Payload Return", AIAA Aerodynamic Decelerator Systems (ADS) Conference, Mar. 2013, in 26 pages.

Berger, E.: "Record-Breaking Balloon Flight", Outside Online, online article dated Jun. 25, 2014. http://www.outsideonline.com/1804196/record-breakingballoon-flight.

Boyle, A.: "Heads Up, Strato-Tourists: World View Begins High-Flying Tests", NBC News, online article dated Jun. 24, 2014. http://www.nbcnews.com/science/space/heads-stratotourists-world-view-begins-high-flying-tests-n138986.

Boyle, A.: "World View Balloon Lofts NASA Experiments to Near-Space Heights," NBC News, online article dated Mar. 9, 2015. http://www.nbcnews.com/science/space/world-view-balloon-lofts-nasa-experiments-near-space-heights-n320216.

Clausing, J.: "Arizona company successfully tests high-altitude balloon for space tourism", US News, online article dated Jun. 24, 2014. http://www.usnews.com/news/business/articles/2014/06/24/company-successfully-tests-space-tourism-balloon.

Denuder, M.: "Development of a Paraglide-Deployment System for a Base Jumping Robot", Bachelor-Thesis, Swiss Federal Institute of Technology Zurich, Jun. 2011, in 111 pages.

Etherington, D.: "World View's 'stratollites' and new spaceport aim to change the business of space", TechCrunch, posted Feb. 23, 2017, in 9 pages. URL: https://techcrunch.com/2017/02/23/world-views-stratollites-and-new-spaceport-aim-to-change-the-business-of-space/.

Foust, J.: "World View tests scale model of its high-altitude balloon system", NewSpace Journal, online article dated Jun. 24, 2014.

http://www.newspacejournal.com/2014/06/24/worldview-tests-scale-model-of-its-high-altitude-balloon-system/.

Gannon, M.: "World View Launches Test Balloon to Edge of Space, Breaks Record", Space.com, online article dated Jun. 24, 2014. http://www.space.com/26340-world-view-balloon-testflight-record.html.

Haugen, J.: "After Successful Flight Test, World View Ready for Next Phase: The Stratospheric Tourism Company Is Setting Its Sights High," Popular Science, online article dated Oct. 26, 2015. http://www.popsci.com/world-view-completes-first.

Howell, E.: "World View Makes Record-Setting Parafoil Flight from Near Edge of Space," Space.com, online article dated Feb. 21, 2015. http://www.space.com/28626-world-view-parafoil-record-flight.html.

Howell, E.: "World View Parafoil Test Flight Touches Edge of Space," Discovery News, online article dated Feb. 23, 2015. http://www.seeker.com/world-view-parafoil-test-flight-touches-edge-of-space-1769541739.html#news.discovery.com.

Klotz, I.: "World View Prototype Balloon Reaches for Edge of Space", Seeker, online article dated Jun. 25, 2014. http://www.seeker.com/world-view-prototype-balloon-reaches-for-edge-of-space-1768745428.html#news.discovery.com.

Knapp, A.: "World View Has A Successful Scaled Test Flight Of Its Balloon To Space", Forbes, online article dated Jun. 24, 2014. http://www.forbes.com/sites/alexknapp/2014/06/24/world-view-has-a-successful-scaled-test-flight-of-its-balloon-tospace/#4e726063f229.

Larimer, S.: "Company takes test flight to the least-crowded tourism hot spot: space", The Washington Post, online article dated Jun. 27, 2014. http://www.washingtonpost.com/news/postnation/wp/2014/06/27/company-takes-test-flight-to-theleast-crowded-tourism-hot-spot-space/.

Lawler, R.: "Google exec sets a new record for highest-altitude jump (video)", Engadget, online article published Oct. 24, 2014. https://www.engadget.com/2014/10/24/google-exec-alan-eustace-stratex-high-altitude-jump/.

Logan, M.: "Flight Brings US Closer to Balloon-Powered Space Tourism", online article dated Feb. 3, 2015. http://www.wired.com/2015/03/parafoil-world-view/.

Markoff, J.: "Parachutist's Record Fall: Over 25 Miles in 15 Minutes", The New York Times, online article published Oct. 24, 2014. http://www.nytimes.com/2014/10/25/science/alan-eustace-jumps-from-stratosphere-breaking-felix-baumgartners-world-record.html?_ r=1.

Moon, M.: "World View Tests a Small Version of Its Balloon-powered Spacecraft," MSN News, online article dated Oct. 27, 2015. http://www.msn.com/en-us/news/technology/world-view-tests-a-small-version-of-its-balloon-powered-spacecraft/ar-BBmtkdA.

New Atlas: "Google exec sets new high-altitude skydiving world record", New Atlas, online article published Oct. 26, 2014. http://newatlas.com/alan-eustace-world-record-skydive-stratex/34423/pictures.

NuancedAdmin: "Paragon Completes Record-Breaking Near-Space Dive Via High-Altitude Balloon", Paragon Space Development Corporation, press release dated Oct. 20, 2015.

O'callaghan, J.: "Balloon Capsule That Will Take People To The Edge Of Space Completes Test Flight," IFLSCIENCE!, online article dated Oct. 28, 2015. http://www.iflscience.com/space/balloon-will-take-people-edge-space-capsule-completes-test-flight/.

Photograph of a parafoil in high altitude flight (assumed to be prior art, but applicant reserves right to confirm actual date of photograph and to dispute status as prior art), accessed Jun. 20, 2016.

PR Newswire: "World View and Ball Aerospace Demonstrate Persistent Remote Sensing from Stratollite Platform", Yahoo Finance, posted Feb. 23, 2017, in 8 pages. URL: http://finance.yahoo.com/news/world-view-ball-aerospace-demonstrate-220000300.html.

Wikipedia Commons: "File: Le premier parachute de Jacques Garnerin, ca. 1799.jpg", uploaded Aug. 12, 2010, in 3 pages. https://en.wikipedia.org/wiki/File:Le_premier_parachute_de_Jacques_Garnerin,_ca._1799.jpg.

World View: "Landmark Space Dive Sets Stage for World View Space Flights", World View, press release dated Oct. 24, 2014.

(56)　　　　　　　References Cited

OTHER PUBLICATIONS

World View: "Major World View Test Flight Readies the Company to Begin Full Scale Flight Testing for Human Private Spaceflights", World View, press release dated Oct. 26, 2015.

World View: "Oct. 24, 2015 Milestone 10% Scale Test Flight", YouTube, published Oct. 24, 2015 (footage of parafoil seen in video), video can be accessed at https://www.youtube.com/watch?v=1-PpJHKHAQc (last accessed: Jul. 13, 2016).

World View: "The Stratollite", YouTube, published Feb. 23, 2017, video can be accessed at https://www.youtube.com/watch?v=GFdXBQPuznU (last accessed May 20, 2019).

World View: "World View Breaks World Record with Successful Test Flight for 2016 Journeys to Edge of Space", World View, press release dated Jun. 24, 2014.

World View: "World View Breaks World Record with Successful Test Flight", YouTube, published Jun. 23, 2014 (footage of parafoil in space seen in video), video can be accessed at https://www.youtube.com/watch?v=sdsVwN-ICX8 (last accessed: Jul. 13, 2016).

World View: "World View One Step Closer to Manned Near-Space Voyages with Record-Breaking Flight", World View, press release dated Feb. 20, 2015.

Zhou, X. et al.: "Optimal Design of Airbag Landing System without Rebound", IOP Conference Series: Materials Science and Engineering, Mar. 2019, vol. 531, in 17 pages.

* cited by examiner

VALVE FOR AIRBAG DECELERATOR

BACKGROUND

Field

The technology relates generally to decelerator systems, in particular to check valves for airbag decelerators.

Description of the Related Art

Decelerator systems are used to decelerate aerospace vehicles upon impact with ground. Existing solutions to deceleration use complex, expensive and heavy machined components that are damaged upon impact and require refurbishment for reuse. There is a need for improvements to these and other drawbacks of decelerator systems.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing approaches to decelerator systems.

Described herein are systems and devices for deceleration of vehicles upon impact with ground. Payload descent vehicles, parafoils, balloons, passenger capsules, spacecraft, and other vehicles may use the decelerator system. For example, a payload may descend to ground via a parafoil from a high altitude balloon. The decelerator system may include an airbag and a valve. The valve may be configured to release air from within the airbag upon impact of the airbag with ground. The valve may be a check valve configured for single use. The valve may include an axially moveable valve body biased by a spring. An increase in pressure within the airbag due to ground impact may overcome the spring biasing force to move the valve body and release air from the airbag. The controlled released air may provide a controlled deceleration due to increased absorption of the impact forces by the deflating airbag. Portions of the valve may be additively manufactured. The valve may include flanges that clamp onto the airbag envelope. The valve may be low cost and single use, such that the valve is replaced with a new valve for the next flight.

In one aspect, an airbag decelerator system includes an airbag and a valve. The airbag includes an envelope defining an interior volume configured to store pressurized air. The valve includes a base, a housing, a spring, and a valve body. The base has a first annular flange defining an opening. The housing has a second annular flange and a sidewall defining an axis. The first and second annular flanges clamp therebetween a portion of the envelope to secure the valve to the airbag. The spring is configured to axially compress and lengthen. The valve body is moveably axially supported inside the housing and biased toward the base by the spring to seal the opening and prevent the pressurized air from escaping the interior volume of the airbag to an exterior of the airbag. The spring is configured to compress such that the valve body unseals the opening to allow the pressurized air to escape the interior volume of the airbag to the exterior of the airbag.

Various embodiments of the various aspects may be implanted. In some embodiments, the spring is conical. In some embodiments, a wide portion of the conical spring faces away from the housing. In some embodiments, the valve body comprises a planar plate moveably axially supported by a stem that extends through the spring. In some embodiments, the stem comprises a threaded longitudinal member and the housing comprises a cylindrical guide surrounding at least a portion of the stem. The cylindrical guide comprising a bushing. In some embodiments, the busing comprises polytetrafluoroethylene (PTFE). In some embodiments, the housing is additively manufactured. In some embodiments, the housing sidewall has a series of openings. In some embodiments, the valve has a maximum radial height beyond the envelope of 3 inches. In some embodiments, the spring is configured to compress in response to a pressure of the pressurized air exceeding a threshold. In some embodiments, the threshold is 10 pounds per square inch (psi).

In another aspect, a valve for an airbag decelerator system includes a base, a housing, a spring, and a valve body. The base has a first annular flange defining an opening. The housing has a second annular flange and a sidewall defining an axis. The first and second annular flanges are configured to clamp therebetween a portion of an airbag fabric to secure the valve to an airbag. The spring is configured to axially compress and lengthen. The valve body is moveably axially supported inside the housing and biased toward the base by the spring to seal the opening. The spring is configured to compress such that the valve body unseals the opening.

Various embodiments of the various aspects may be implanted. In some embodiments, the spring is conical. In some embodiments, a wide portion of the conical spring faces the opening. In some embodiments, the valve body is moveably axially supported by a longitudinal member that is guided by a bushing. In some embodiments, the housing is additively manufactured. In some embodiments, the valve has a maximum overall axial height H1 of 3 inches. In some embodiments, the spring has a spring constant of between about 3 lbf/in to about 8 lbf/in.

In another aspect, a high altitude platform includes a lighter than air system and an airbag decelerator system. The lighter than air system is configured to lift a payload off the ground to an altitude of above 50,000 feet. The airbag decelerator system is configured to provide cushioning to the payload upon returning to the ground. The airbag decelerator system includes an airbag and a valve. The airbag includes an envelope defining an interior volume configured to store pressurized air. The valve includes a base, a housing, a spring, and a valve body. The base has a first annular flange defining an opening. The housing has a second annular flange and a sidewall defining an axis. The first and second annular flanges clamp therebetween a portion of the envelope to secure the valve to the airbag. The spring is configured to axially compress and lengthen. The valve body is moveably axially supported inside the housing and biased toward the base by the spring to seal the opening and prevent the pressurized air from escaping the interior volume of the airbag to an exterior of the airbag. The spring is configured to compress such that the valve body unseals the opening to allow the pressurized air to escape the interior volume of the airbag to the exterior of the airbag.

Various embodiments of the various aspects may be implanted. In some embodiments, the spring is conical. In some embodiments, the housing is additively manufactured. In some embodiments, the valve body is moveably axially supported by a longitudinal member extending through a cylindrical guide. In some embodiments, the valve has a maximum axial height beyond the envelope of 3 inches.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment." or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

Example Flight Vehicle with Decelerator System

Figure 1A:
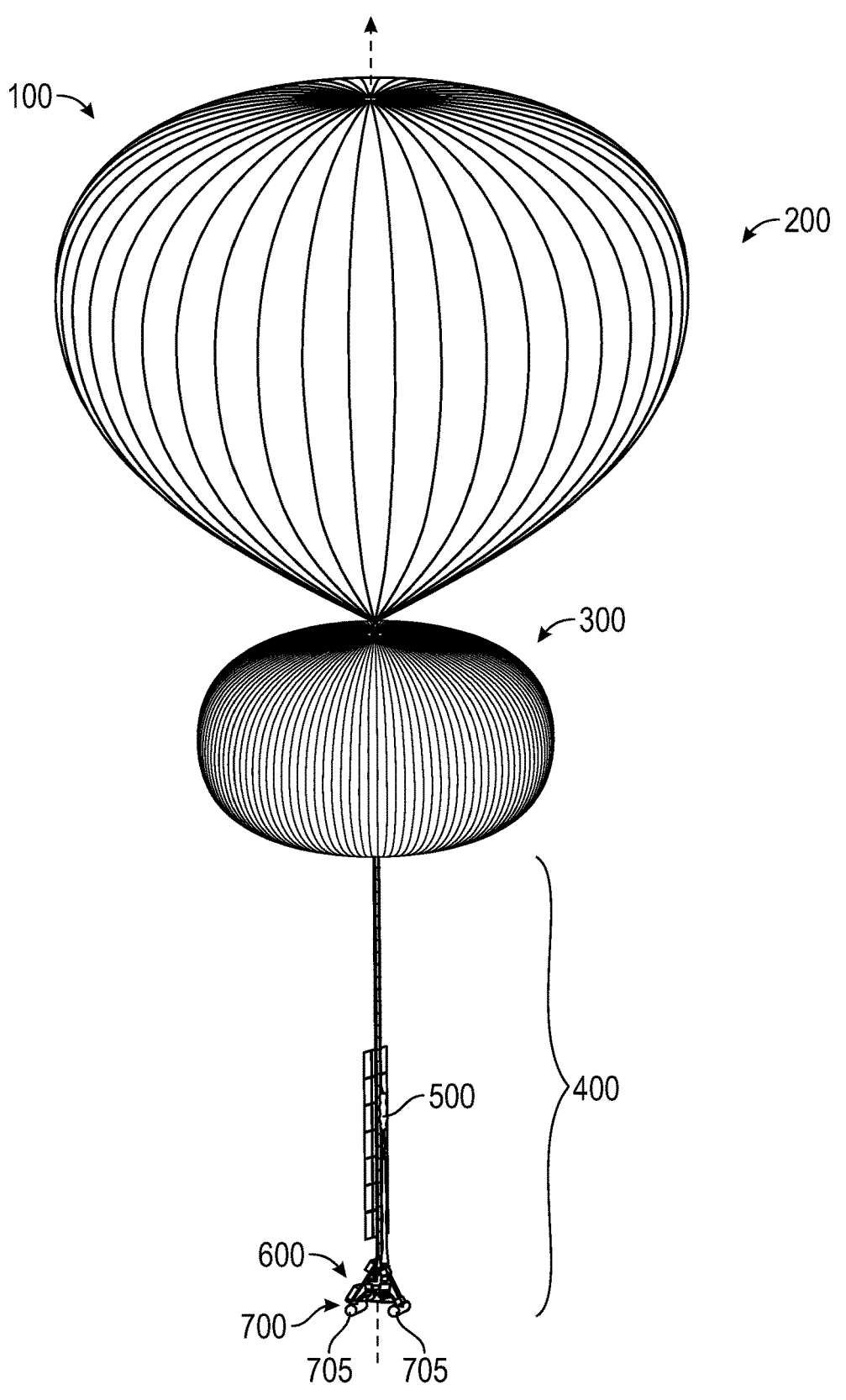
FIG. 1A is a top perspective view of an example flight vehicle having an embodiment of a decelerator system with an airbag and a check valve.

FIG. 1A is an example flight vehicle 100 in flight and having an embodiment of a decelerator system 700. The flight vehicle 100 may be used for high altitude flight. As used herein, "high altitude" refers to altitudes that are in the stratosphere (above 35,000 feet), and includes without limitation altitudes in the troposphere, the tropopause, and the stratosphere of Earth's atmosphere. In some embodiments, the flight vehicle 100 may be used at altitudes about 50,000 feet. The flight vehicle 100 includes a zero pressure balloon (ZPB) 200 attached above a super pressure balloon (SPB) 300, from which is suspended a stratocraft 400. The stratocraft 400 releasably supports a descent system 500, such as a parafoil, attached to a payload support 600. The descent system 500 may detach from the flight vehicle 100 and descend to ground with the payload support 600.

The decelerator system 700 is attached to an underside of the payload support 600. One or more airbags 705 of the decelerator system 700 each having one or more air release valves may absorb impact upon landing and controllably release air, as further described. The various flight vehicles may include the decelerator system 700. As further described, the decelerator system 700 includes one or more decelerator assemblies 706 that each include the airbag 705 and one or more valves 800 (see FIGS. 2-3C). The decelerator system 700 is used for deceleration of the flight vehicle 100, or portions thereof such as the descent system 500 and payload support 600, upon impact with ground. The decelerator system 700 may be implemented with a variety of different flight vehicles and/or descent systems, such as parafoils, balloons, passenger capsules, spacecraft, and other vehicles. As shown in this example, a payload supported by the payload support 600 may descend to ground from the flight vehicle 100 via the descent system 500 from a high altitude system comprising the ZPB 200 and SPB 300.

As further described, the valve 800 may be configured to release air from within the airbag 705 upon impact of the airbag 705 with ground. The valve 800 may be a check valve and/or configured for single use. The valve 800 may include an axially moveable valve body biased by a spring. An increase in pressure within the airbag 705 due to ground impact overcomes the spring biasing force to move the valve body and release air from the airbag 705. The controlled released air provides a controlled deceleration of the payload support 600 due to increased absorption of the impact forces by the deflating airbag 705. Some or all of the valve 800 may be additively manufactured. The valve 800 may clamp onto an envelope 710 of the airbag 705. The valve 800 may be low mass, low cost and single use, such that, after a flight, the valve 800 is replaced with a new valve for the next flight. These and other features are described in further detail herein.

Many different flight vehicles may use the decelerator system 700. As shown, the flight vehicle 100 may be a lighter-than-air (LTA) flight vehicle. The flight vehicle 100 may include the ZPB 200 that provides lift and is attached in tandem with one or more variable air ballast SPB's 300. The ZPB 200 is a lifting balloon. The primary function of the ZPB 200 is to provide lift to the flight vehicle 100. An LTA gas is provided inside the ZPB 200 in an amount at launch sufficient for the LTA system 100 to take off. The ZPB 200 may be a "zero-pressure" type of balloon that contains an LTA gas therein for providing lift to the LTA system 100. The ZPB 200 may be filled with helium or hydrogen. A "zero-pressure balloon" is normally open to the atmosphere via hanging or attached ducts to prevent over-pressurization.

The SPB 300 provides a controlled and variable air ballast supply and emission (i.e. two-way ballast control) from ambient air in the surrounding atmosphere. A compressor, with sufficient air volume flow rate capabilities, may provide sufficient ambient air to the SPB 300 even at low densities in high altitudes for rapid descent or altitude maintenance. A controllable valve, separate from the valve(s) 800 of the decelerator system 700, may be sized and controlled for sufficient air release from the SPB for rapid ascent or altitude maintenance. The primary function of such SPB 300 may thus be to provide a variable amount of ballast air to the LTA system 100. Ballast air may be taken into the SPB 300 in the form of compressed air to provide a greater downward force to the LTA system 100. Ballast may be ejected from the SPB 300 to provide a smaller downward force to the LTA system 100. In some embodiments, the LTA system 100 includes only one SPB 300. However, the LTA system 100 may include multiple SPB's 300, for example, two, three, four, or more SPB's 300. The SPB 300 may be a "super-pressure" type of balloon that is completely enclosed and operates at a positive internal pressure in comparison to the external atmosphere. Pressure control enables regulating the mass of air in the SPB 300, and therefore the overall buoyancy of the LTA system 100. This buoyancy regulation enables altitude control of the LTA system 100. The SPB 300 may take in more air to apply more of a ballast force, for example to descend, or to compensate for an expanding ZPB 200 that is producing more lift, as described. Conversely, the SPB 300 may release air to apply less of a ballast force, for example to ascend, or to compensate for a contracting ZPB 200 that is producing less lift. In some embodiments, the SPB 300 may include lifting gas, in addition to or alternatively to the ZPB 200. In some embodiments, other types of balloons besides ZPB's and SPB's may be used, either in addition or alternatively.

The SPB 300 supports the stratocraft 400. As shown, the stratocraft 400 is a structural system coupled under and with the SPB 300. In some embodiments, there are various intermediate structures and/or systems between the SPB 300 and the stratocraft 400, such as structural connectors, release mechanisms, other structures or systems, or combinations thereof. The stratocraft 400 includes one or more systems related to various mission objectives. The stratocraft 400 may include various subsystems, such as power, control, communications, air intake, air release, payload descent, etc., for supporting a mission. The stratocraft 400 may include or support the payload support 600 having a payload for a particular mission.

Figure 1B:
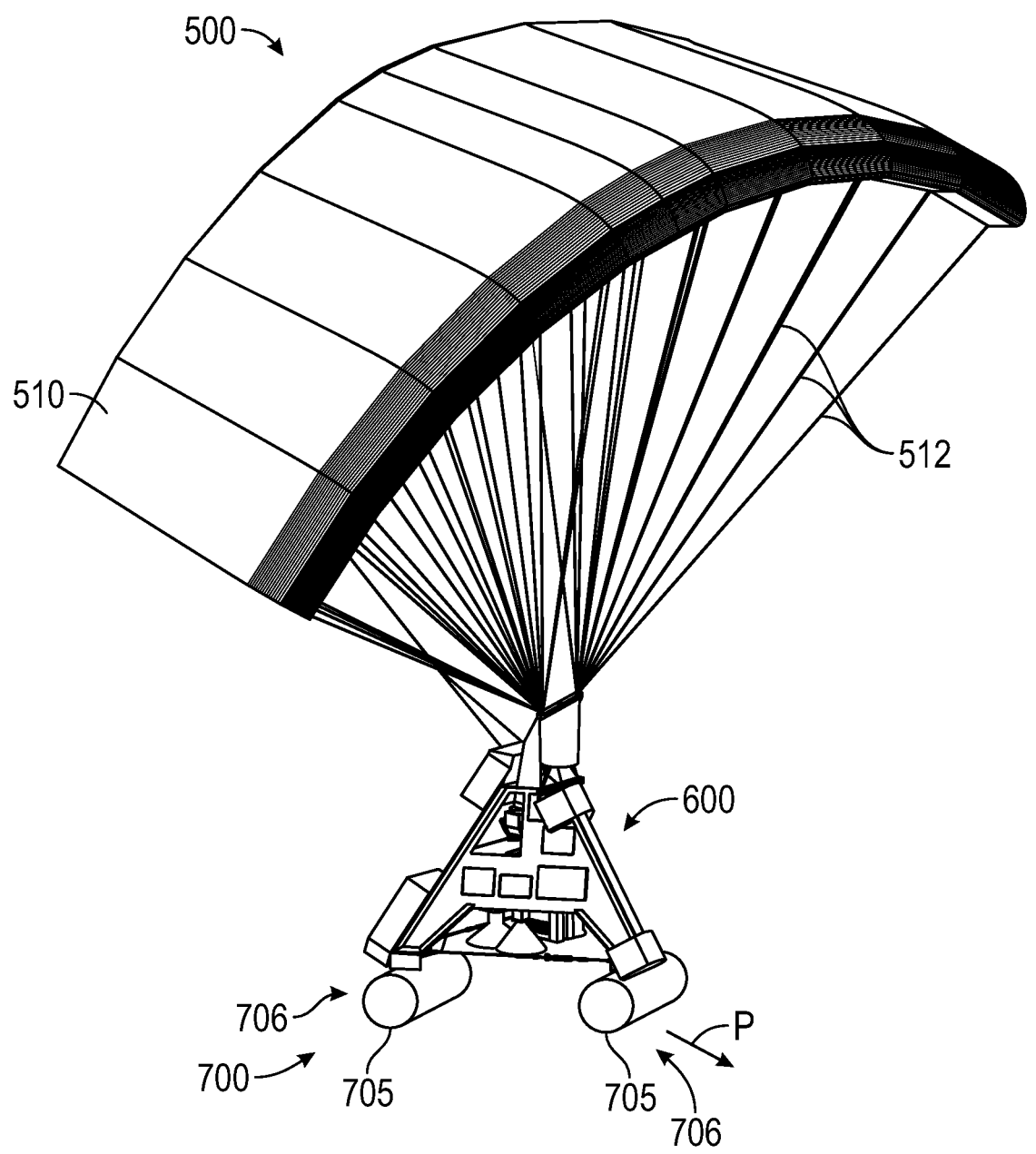
FIG. 1B is a top perspective view of a parafoil descent system of the flight vehicle of FIG. 1A in the separated and deployed configuration and having the decelerator system attached to an underside of a payload support structure.

The payload support 600 provides structural support to a payload and/or other subsystems. The payload may be a variety of different systems, including but not limited to instruments, sensors, and/or passenger space capsules. For reference, a direction P is indicated in FIG. 1B. The direction P is a geometric reference direction that is "fixed" to the payload support 600 frame of reference, such that the direction P points in different directions as the payload support 600 rotates. The payload support 600 may be a frame such as a rigid structure providing support and stability to various features of the system. The payload support 600 may be formed from a variety of suitable materials, including metals, composites, other materials, or combinations thereof. The payload support 600 may have a variety of configurations. As shown, the payload support 600 is in the shape of a tetrahedron.

The payload support 600 may be releasably coupled with the stratocraft 400 or portion thereof. The payload support 600 is attached during flight, such as to ladder ropes. The payload support 600 may be directly attached to a lifting balloon, such as the ZPB 200 or the SPB 300. The payload support 600 is then released for descent back to ground with the descent system 500 and payload.

Example Descent System with Decelerator System

As shown in FIG. 1B, the descent system 500, shown as a parafoil, is separated from the LTA system 100 and in a deployed flight configuration with the payload support 600. The airbags 705 of the decelerator system 700 are supported underneath the payload support 600. There may be one, two, three, four, or more of the airbags 705. The airbags 705 may be evenly spaced about a central axis at a lower end of the flight vehicle. The airbags 705 may be elongated and/or located along an outer perimeter of the payload support 600. One or more of the airbags 705 may have a long axis parallel or angled with respect to a long axis of one or more other airbags 705. One or more of the airbags 705 may have a long axis generally perpendicular to a direction of travel of the descent system, such as the direction P. Lower ends of the airbags 705 may be located to a similar extent to define a generally horizontal plane. The airbags 705 may be elongated, spherical, other shapes, or combinations thereof.

The descent system 500 may separate from the flight vehicle 100 and deploy in the flight configuration to descend to ground with the payload support 600 and decelerator system 700. In some embodiments, the descent system 500 may be configured to deploy into the flight configuration before separating from the rest of the flight vehicle 100. The descriptions of particular configurations of the descent system 500, and of particular deployment and flight procedures of the descent system 500, are not meant to limit the scope of the use of the decelerator system 700 and related methods to only those particular configurations, systems, and procedures explicitly described herein.

The descent system 500 may include a canopy 510, for example an at least partially soft structure that provides lift to the descent system 500. The canopy 510 may have more rigid features, such as stiffeners, local attachments, etc. The deployed canopy 510 is generally shaped like a bent wing, with a cross-sectional geometry approximating an airfoil shape. The descent system 500 may include one or more lines 512 that couple the canopy with the payload support 600.

The flight vehicle 100 with descent system 500 shown is merely one example vehicle that may use the decelerator system 700. Other embodiments of flight vehicles 100 may include only the ZPB 200, only the one or more SPB's 300, other descent systems besides or in addition to a parafoil, and/or other balloons or components. Other flight vehicles, descent systems, and components may use or incorporate the decelerator system 700, for example those described in U.S. Pat. No. 9,540,091, issued Jan. 10, 2017 and titled HIGH ALTITUDE BALLOON SYSTEMS AND METHODS, in U.S. Pat. No. 10,988,227, issued Apr. 27, 2021 and titled HIGH ALTITUDE BALLOON SYSTEMS AND METHODS USING CONTINUOUS MULTI-COMPARTMENT SUPER PRESSURE BALLOON, in U.S. Pat. No. 9,694, 910, issued Jul. 4, 2017 and titled NEAR-SPACE OPERATION SYSTEMS, in U.S. Pat. No. 10,787,268, issued Sep. 29, 2020 and titled RIGIDIZED ASSISTED OPENING SYSTEM FOR HIGH ALTITUDE PARAFOILS, in U.S.

Patent Pub. No. 2017/0331177, published Nov. 16, 2017 and titled HIGH ALTITUDE BALLOON ANTENNA SYSTEMS, in U.S. Pat. No. 9,868,537, issued Jan. 16, 2018 and titled RISER RELEASE FLARING SYSTEM FOR PARAFOILS, in U.S. Pat. No. 10,124,875, issued Nov. 13, 2018 and titled CONTINUOUS MULTI-CHAMBER SUPER PRESSURE BALLOON, and in U.S. Pat. No. 10,336,432, issued Jul. 2, 2019 and titled LIGHTER THAN AIR BALLOON SYSTEMS AND METHODS, the entirety of each of which is hereby incorporated by reference and forms a part of this specification for all purposes.

Example Airbag Embodiment

Figures 2, 3A:
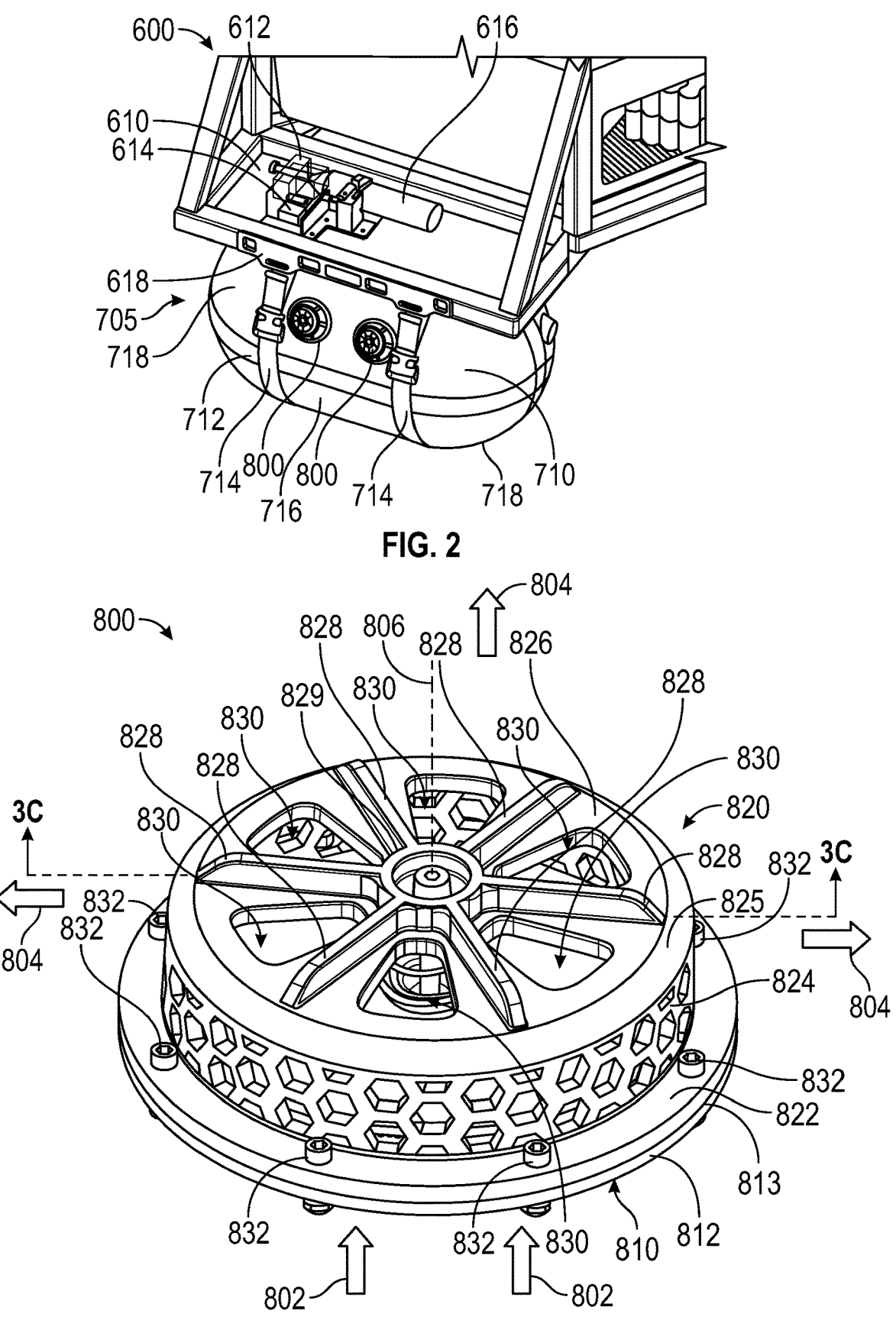
FIG. 2 is a closeup top perspective view of an embodiment of the decelerator system that may be used with a variety of different flight vehicles.
FIG. 3A is a top perspective view of an embodiment of the check valve separated from the airbag and that may be used with the decelerator system.

FIG. 2 is a closeup view of one of the airbags 705 of the decelerator system 700. The decelerator system 700 may be an airbag landing system. The decelerator system 700 may be used for absorbing landing forces and attenuating such forces to reduce the risk of damage to the payload and other structures. The decelerator system 700 may provide cushioning to a payload upon landing. The decelerator system 700 may be used for landing flight vehicles, or in other contexts in aerospace and commercial industries, e.g. landing space capsules, dropping supplies from aircraft, or people jumping out of burning buildings. The airbag 705 may be a large inflatable that needs to vent off pressure spikes to prevent bouncing and inducement of larger loads due to impact. The air may be vented via the valves 800 at a continuous and fixed pressure to avoid acceleration spikes. The airbags 705 of the decelerator system 700 may each have two of the valves 800. There may be one, three, four, five, or more of the valves 800 per airbag 705. Each airbag 705 may have an overall width of about 24 inches, and/or an overall length of about 48 inches.

The airbag 705 is shown attached to an embodiment of the payload support 600 having a shelf 610. The shelf 610 may house devices and electronics for operating the decelerator system 700. The shelf 610 may include a compressor 612 and/or controller 614 for establishing, maintaining and/or regulating a pressure of the decelerator system 700. The controller 614 may be configured to detect the pressure reading inside the airbag 705 and cause the compressor 612 to provide air to the airbag 705 in response. In some embodiments, a tank 616 comprising various gases may be used to provide the inflation pressure for filing the airbag 705. In some embodiments, the tank 616 may store compressed air for filling the airbag 705. In some embodiments, the tank 616 may store CO2 for filling the airbag 705. In some embodiments, the compressor 612 may use ambient air. The decelerator system 700 may be attached to the shelf 610 via one or more straps 712. The straps 712 may extend around the decelerator system 700 and attach to brackets 618 on the shelf 610. The straps 712 may be vertically oriented. There may be two straps 712 carrying the airbag 705 under the shelf 610.

The airbag 705 may include an envelope 710 defining a cavity therein configured to receive pressurized air. The envelope 710 may be a fabric, such as textiles or other collapsible material, configured to deform under pressure applied due to contact with ground or other landing structures. The envelope 710 may define a closed internal volume for retaining the pressurized air. The compressor 612 and/or controller 614 may provide air and maintain a particular pressure within the envelope 710. The envelope 710 may be inflated prior to and during launch, after launch, during descent, and/or immediately prior to landing. The envelope 710 may be in selectable fluid communication with ambient air via the valves 800 and/or to the tank 616 via a fluid connection line to the compressor 612 and/or other valve.

The envelope 710 may be generally elongated as shown with a central cylindrical portion 716 and rounded, e.g. spherical, ends 718. Other shapes may be used, such as square, rectangular, cylindrical with flatter ends, other shapes, or combinations thereof. The envelope 710 may be elongated along an axis that is non-parallel to other axes along which other envelopes 710 of the other airbags 705 on the flight vehicle extend.

The decelerator system 700 may include one or more horizontal strap 712 and/or vertical straps 714 extending around each respective envelope 710. The straps 712, 714 may have other orientations besides vertical and horizontal. As shown a single horizontal strap 712 may extend longitudinally around the elongated perimeter of the airbag 705. Two vertical straps 714 may extend circumferentially around the cylindrical portion of the airbag 705. The various straps 712, 714 may be separate pieces, or they may be a single, long strap connected together or manufactured as one piece. The vertical straps 714 may extend around the airbag 705 and attach to the brackets 618 to thereby secure and carry the airbag 705 with the payload support 600. The straps 712, 714 may be attached to the envelope 710 along the length of the strap 712 such that the straps 712, 714 stay attached to the envelope 710 when deflated or under-inflated. The straps 712, 714 may further provide structural support and compressive resistance to the envelope 710 under high inflation pressures. The straps 712, 714 may thus be load bearing members, for example to absorb hoop stresses on the envelope 710 from the pressurized internal air. The straps 712, 714 may absorb forces due to overinflation of the envelope 710 upon impact with ground and prior to release of internal air via the one or more valves 800.

The valves 800 may be attached to the envelope 710. The envelope 710 may be discontinuous, with the valves 800 located in the discontinuities to seal the internal air. The envelope 710 may have circular openings with correspondingly circular valves 800 attached to the fabric of the envelope 710 at the circular openings. The valves 800 may be attached on the cylindrical portion 716 of the envelope 710 as shown, and/or in other locations of the envelope 710 such as the ends 718, other sides of the cylindrical portion 716, and/or other locations.

The valves 800 may emit air from inside of the envelope 710 in a direction radially away from the envelope 710. The valves 800 may be located such that emitted air is directed away from the descent system 500 and/or instruments of the payload support 600. The valves 800 may be located adjacent to each other, or they may be separated. The valves 800 may be located on a top portion of the envelope 710 to avoid contact with ground. This orientation may prevent blockage of the valves 800 from emitting air and also prevent or mitigate damage to the valves 800 upon landing. The valves 800, and/or airbags 705 with the valves 800, may be designed for replacement after each landing, as further described.

Example Valve Embodiment

Figure 3B:
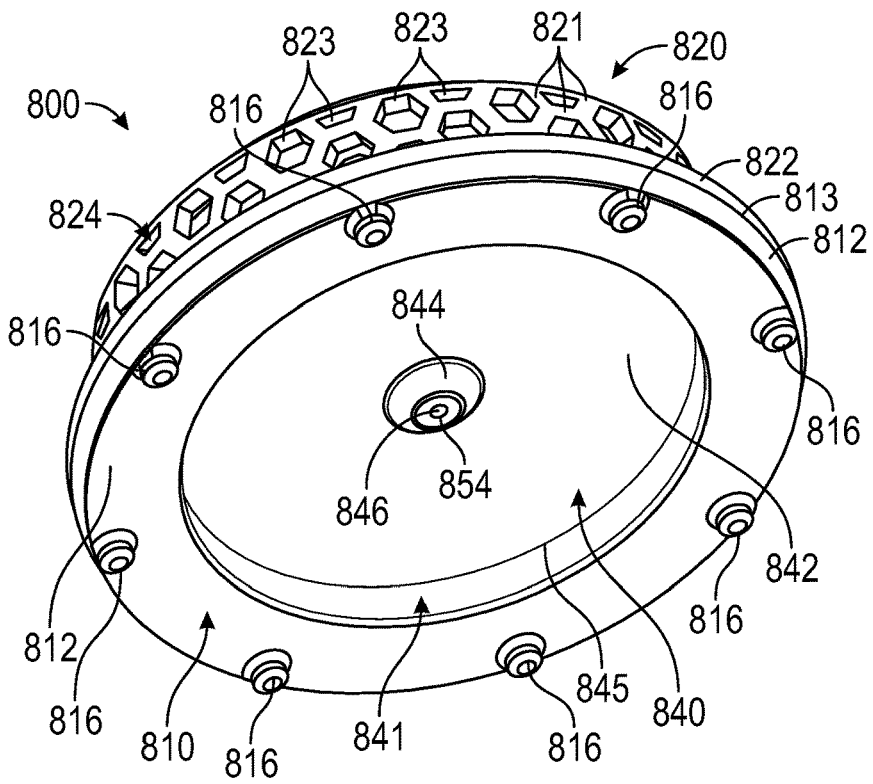
FIG. 3B is a bottom perspective view of the check valve of FIG. 3A.
Figure 3C:
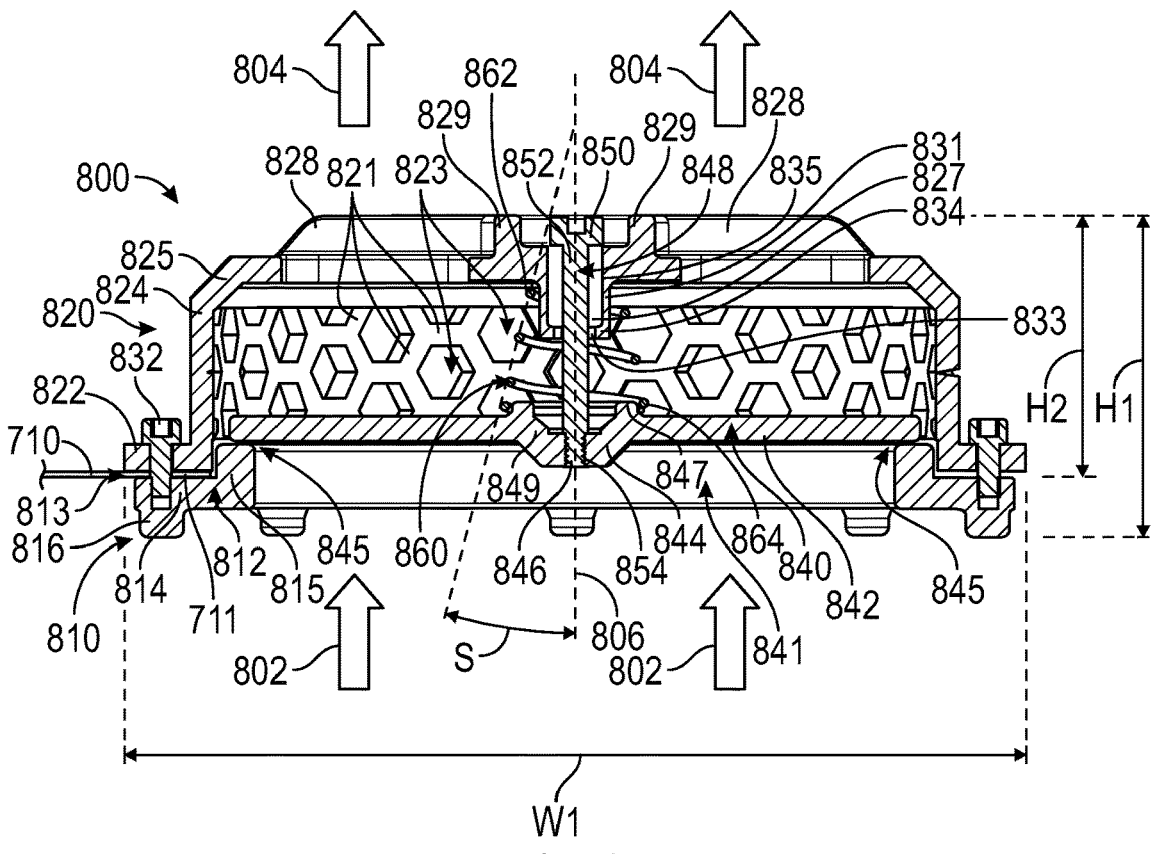
FIG. 3C is a cross-section view of the check valve of FIGS. 3A and 3B.

FIGS. 3A-3C are various views of the valve 800, shown in isolation from the airbag 705, that may be used with the decelerator system 700. FIG. 3A is a top perspective view, FIG. 3B is a bottom perspective view, and FIG. 3C is a cross-section view of the valve 800 as taken along the line 3C-3C indicated in FIG. 3A.

The valve 800 may include a base 810, a housing 820, a valve body 840, and/or a spring 860. The base 810 may support and be attached with the housing 820. The valve body 840 may be axially moveably supported within the housing 820 to controllably allow airflow through the valve

800. The spring 860 may bias the valve body 840 into the sealingly closed position as shown, i.e. downward as oriented in FIG. 3C along a central axis 806 defined by the valve 800. Air 802 from inside the envelope 710 may flow through the base 810 when the air 802 exerts sufficient pressure on the valve body 840 to cause the spring 860 to compress. The air 804 may then exit the housing 820 via the top and/or sides. Air may be allowed to flow through the valve 800 until the downward force from the spring 860 on the valve body 840 overcomes the upward pressure forces on the valve body 840 exerted by the remaining internal air 802 inside the envelope 710. The valve body 840 may thus move axially along the axis 806 to release air through the valve 800. The axial movement and other design features herein may provide for a reliable valve 800. The valve 800 may also be disposable. The housing 820 and/or other structures may be additively manufactured (3D printed) for simple fabrication of complex lightweight structures that can be disposed after each use and replaced with a newly additively manufactured structure. The housing 820 and/or other parts may be additive manufactured from Aluminum, or laser sintered nylon plastic, or other printable materials. Given the short downtime between flights of some flight vehicles, the valve 800 provides for easy and fast replacement with less expense. In some embodiments, the valve 800 or portions thereof may be reusable, for example if not damaged during landing. These and other features of the valve 800 are further described herein.

The base 810 includes a lower, annular flange 812 defining an opening 841 through which the air 802 from inside the envelope 710 enters the valve 800. The flange 812 may extend circumferentially around the axis 806. The flange 812 may include a radial portion 814 that extends radially outwardly and generally planar to the envelope 710 adjacent to the flange 812. The radial portion 814 may sandwich material of the envelope 710 underneath the flange 812 at a clamping interface 813 when assembled. The flange 812 may include an upward protrusion 815 extending upwardly from a radially inward end of the radial portion 814. The upward protrusion 815 may extend annularly to define the annular opening 841. The upward protrusion 815, for example a top surface thereof, may form part of a sealing interface 845 with the valve body 840. Movement of the valve body 840 upward may create a gap at the sealing interface 845 through which the air 802 may flow into and through the valve 800. The flange 812 may include a series of downward protrusions 816 having openings therein, which may be threaded, configured to receive a respective fastener 832. The fasteners 832, such as a bolt, may extend through aligned holes in, and thereby attach together, the base 810 and the housing 820. In some embodiments, the downward protrusion 816 may extend annularly along the lower surface of the flange 812 to form a wall. In some embodiments, there may not be downward protrusions 816 and instead, for example, nuts may be used.

A sidewall 824 extends upwardly from and annularly along a radially inner end of a flange 822 of the housing 820. The sidewall 824 includes a plurality of ribs 821 defining a plurality of openings 823 through the sidewall 824. The ribs 821 and openings 823 may be distributed annularly around most or all of the sidewall. The ribs 821 may be straight segments or struts defining hexagonal openings 823. The ribs 821 may be straight, curved, or combinations thereof, and defining circular, oval, square, rectangular, or other shaped openings 823. The air 804 exiting the valve 800 may flow through the openings 823. There may be at least ten, at least twenty, at least thirty, at least forty, at least fifty, at least seventy-five, at least one hundred, or more of the openings 823.

The sidewall 824 may extend upward to an upper portion 826 that extends across an upper end of the sidewall 824. The upper portion 826 may be located axially upward from the flange 822. The upper portion 826 may form a roof or ceiling of the housing 820. A bevel 825 may connect upper ends of the sidewall 824 to radially outer edges of the upper portion 826. The upper portion 826 may have flat, planar sections defining upper openings 830 therethrough. The upper openings 830 may be triangular, as shown, or other shapes, such as radially elongated shapes, rectangles, other shapes, or combinations thereof. Radial webs 828 may protrude upward from and extend radially along the upper portion 826. There may be six openings 830 and/or six radial webs 828 as shown, or there may be one, two, three, four, five, six seven, eight, nine, ten or more of the openings 830 and/or radial webs 828. A central wall 829 may extend around a central region of the upper portion 826, through which the axis 806 extends, and connect to radially inner ends of the webs 828 at a perimeter of the central region of the upper portion 826. The wall 829 may be circular as shown, or square, elongated, other shapes, or combinations thereof. The wall 829 may surround a recess in the upper portion 826. The wall 829 may surround a space therebetween in which parts of the valve body 840 are located.

As shown in FIG. 3C, the valve body 840 may translate linearly along the axis 806. The valve body 840 may rotate about the axis 806, or be rotationally stationary. The valve body 840 may stay aligned with, for example parallel to, the axis 806 as it moves up and down. In some embodiments, the valve body 840 may only translate along the axis 806 and not rotate at all, or the valve body 840 may translate along the axis 806 and rotate only about the axis 806 but not rotate about any other axes.

The housing 820 may include a central, downward-extending sidewall 831 defining a bore 835 therein. The sidewall 831 may extend annularly and downward from the upper portion 826, for example from the central wall 829 and/or from one or more radial webs 828. The sidewall 831 may define the bore 835 extending downward from the recess between the central wall 829. The sidewall 831 at a lower end thereof may have a radially inward lip 834. The sidewall 831 at a lower end thereof, e.g. at the lip 834, may define an opening 833 therethrough. The valve body 840 may include a stem 848, such as a bolt, screw, or other longitudinal member, extending through the opening 833. The stem 848 may include an upper head 850 connected to an elongated shaft 852. The upper head 850 may have a larger width than the shaft 852. The upper head 850 may have a recess therein for rotating the stem 848 to assemble the valve body 840. The shaft 852 may extend downward from the head 850 and through the opening 833. The shaft 852 may terminate in a lower end 846, which may be threaded as shown.

A guide 827, such as a bushing, may surround an upper portion of the stem 848 located inside the bore 835. The guide 827 may be an elongated, cylindrical bushing or other component secured within the sidewall 831 and defining a central opening therethrough and through which the shaft 852 extends. The guide 827 may be formed of polytetrafluoroethylene (PTFE) or any other suitable material. The guide 827 may rotate within the bore 835 relative to the sidewall 831 about the axis 806, and/or the stem 848 and guide 827 may rotate relative to each other about the axis 806. In some embodiments, the guide 827 may not translate relative to the housing 820, e.g. relative to the sidewall 831. The guide 827 may be mechanically fixed, e.g. adhered, within the bore 835 to the sidewall 831. The stem 848 may translate relative to the guide 827. The shaft 852 may slide within the guide 827. An outer surface of the shaft 852 may slidingly engage an inner surface of the guide 827 as the shaft 852 translates along the axis 806. Lubricants may be used on the shaft 852 and/or guide 827 to reduce friction between the two parts. In some embodiments, the guide 827 may be fixedly attached with the shaft 852 and/or other portions of the stem 848, e.g. bonded, such that the guide 827 and stem 848 move axially together. The guide 827 may thus move with respect to the housing 820, e.g. the sidewall 831. Lubricant may be applied between the guide 827 and sidewall 831. The guide 827 may have a lower end that seats on a radially inward flange at the lowered end of the sidewall 831. The lip 834 of the sidewall 831 may limit downward axial movement of the guide 827. The head 850 of the stem 848 may be wider than the inner hole of the guide 827 such that the upper surface of the guide 827 limits downward movement of the stem 848 relative to the guide 827. The lip 834 of the sidewall 831 may thus limit downward axial movement of the stem 848.

The valve body 840 may include a plate 842. The plate 842 may be planar or otherwise extend to cover the lower opening 841 of the housing 820. The plate 842 may be a solid part that conforms to the shape of the opening 841, e.g. circular, or otherwise conforms to the contour of the annular flange 812, e.g. to the upward protrusion 815. In some embodiments, the plate 842 may be planar, mostly planar, completely planar, curved, have one or more protrusions, or combinations thereof. The plate 842 may be impervious to air flow. The plate 842 may block the internal air 802 from flowing into and through the opening 841 when seated in the downward, closed position as shown in FIG. 3C. The plate 842 may allow air flow through the valve 800 when moved axially upward into an open position to unseal the sealing interface 845.

The plate 842 may be attached to the stem 848. The lower end 846 of the stem 848 may extend into and/or through the plate 842. The lower end 846 of the stem 848 may be immovably attached to the plate 842 such that the stem 848 and plate 842 will move axially together. The lower end 846 may include external threads that engage with corresponding internal threads of an opening 854 of the plate 842. The stem 848 and plate 842 may be attached with threads, brackets, fittings, adhesive, welds, other mechanical attachments, or combinations thereof. The stem and plate 842 may be a single integral part with no discontinuity therebetween.

The plate 842 may define the opening 854 extending through a center or generally central region of the plate 842. The opening 854 may be a through-hole as shown extending from a top surface of the plate 842 to a bottom, opposite surface of the plate 842. In some embodiments, the opening 854 may be a blind hole or bore that does not extend completely through the plate 842. The opening 854 may have internal threads and/or other features to attach to the stem 848. The opening 854 may be located in a central nub 844 of the plate 842 having a sidewall 849 that inclines radially downward as oriented in FIG. 3C. The plate 842 may have a larger thickness at and/or near the nub 844, e.g. the sidewall 849, compared to portions of the plate 842 located radially farther outward. The sidewall 849 may extend annularly around the opening 854. The opening 854 may extend through radially inward edges of the sidewall 849. The nub 844 may include an upward protrusion 847 extending upwardly away from the plate 842 in a direction opposite the sidewall 849. The upward protrusion 847 may extend annularly around the opening 854. The nub 844, e.g. the sidewall 849 and upward protrusion 847 thereof, may provide a greater stiffness to the plate 842 at the region of attachment with the stem 848 as compared to radially outer and/or flatter regions of the plate 842.

In some embodiments, the plate 842 and/or flange 812, such as the upward protrusion 815, may include one or more seals (not shown), such as a gasket or rubber or polymer strip, located at or around the sealing interface 845. Such seal may extend along a lower outer perimeter of the plate 842, and/or along an upper inward perimeter of the flange 812, such as a top surface and/or radially inward surface of the upward protrusion 815. In some embodiments, there may not be a seal.

The spring 860 may be located within the housing 820. The spring 860 may define an axis that is coaxial and/or parallel with the central axis 806. The spring 860 may extend from an underside of the upper portion 826 downward to a top side of the plate 842. An upper end 862 of the spring 860 as oriented may surround the sidewall 831 of the housing 820. The spring 860 may contact the upper portion 826 generally underneath the central wall 829. The central wall 829 and/or radial webs 828 may provide a stiffness to the upper portion 826 to counter the upward force from the spring 860. The sidewall 831 may locate and maintain the position of the upper end 862 of the spring 860. The opposite, lower end 864 of the spring 860 as oriented may surround the nub 844, e.g. the upward protrusion 847 of the nub 844. The upward protrusion 847 may locate and maintain the position of the lower end 864 of the spring 860.

The spring 860 may be conical as shown. The upper end 862 may have a smaller diameter than the lower end 864. The lower end 864 may have a greater diameter than the upper end 862. The wider end 864 of the spring 860 may face away from the housing 820 and toward the plate 842. The narrower end 862 of the spring 860 may face toward the housing 820 and away from the plate 842. The spring 860 may thus increase in diameter in a direction from the upper end 862 toward the lower end 864, and decrease in diameter in an opposite direction from the lower end 864 toward the upper end 862. Thus, the narrower, upper coils of the spring 860 may nest within the wider, lower coils when compressed. The conical shape therefore allows the spring 860 to compress a greater amount as compared to a cylindrical spring. A cylindrical spring would have a compressed length limited by the diameter of the coils, e.g. a diameter of the wire that forms the spring multiplied by the number of coils in the spring. The conical shaped spring 860, however, may have no such limitation as it may be compressed to a minimum height of the spring wire diameter. The spring wire diameter may be approximately 0.03125 inches in some embodiments. The coils of the conical spring 860 may be configured such that each coil can nest within the next adjacent larger diameter coil. The conical spring 860 may allow for a lower overall height H1 of the valve 800, e.g. as compared to using a cylindrical spring. For a given downward force or spring constant, the conical shape may allow for a smaller spring height compared to a cylindrical spring. The nested spring coils of the compressed conical spring 860 can allow the plate 842 to compress over a greater distance than a cylindrical spring of the same uncompressed height as the conical spring 860 in a valve 800 having the same height H1. While a conical spring 860 is shown in the embodiment of FIGS. 3A-3C, the spring 860 may have other nesting or non-nesting configurations.

The spring 860 may have a spring constant in the range from about 3 lbf/in to about 8 lbf/in. The spring 860 may be configured to compress in response to a pressure of the pressurized air 802 exceeding a threshold from about 2 psi to about 10 psi. The spring 860 may be made of steel, titanium, other materials, or combinations thereof. The wire forming the coils of the spring 860 may have a circular cross-section, or other shapes such as square, polygonal, or combinations thereof. The wire may have a diameter of about 0.03125 in. In some embodiments, the wire may have a diameter from about 0.03125 in to about 0.075 in, or from about 0.035 in to about 0.049 in. The spring 860 in its natural state may have a free length from about 0.5 (in) to about 1.0 in. The spring 860 may have a compressed operating length, for example when the sealing interface 845 is fluidly sealed from about 0.5 in to about 1 in. The spring 860 may have a minimum compressed operating length, for example when the sealing interface 845 is opened due to pressure from the air 802 from about 0.05 in to about 0.5 in. The spring 860 may have an absolute, incompressible minimum length of 0.03125 inches, or from 0.03125 to 0.75 inches.

In some embodiments, the spring 860 may be inverted, such that the upper end 862 has a larger diameter than the lower end 864. In some embodiments, the spring 860 may have conical portions, cylindrical portions, or combinations thereof. In some embodiments, a cylindrical shaped spring 860 may be used. In some embodiments, a plurality of the springs 860 may be used. There may be one, two, three, four, five, or more of the springs 860 within a single valve 800. The plurality of springs 860 may be coaxial, e.g. nested about each other, or non-coaxial, e.g. spaced apart from each other.

The spring 860 may be a compression spring configured to apply a downward force on the valve body 840. The spring 860 may maintain and/or restore a fluidly sealed interface 845. The spring 860 may provide the sealed interface 845 prior to and after impact of the decelerator system 700 with ground, or otherwise prior to and after an internal, upward pressure of air inside the envelope 710 overcomes the downward force of the spring 860 on the plate 842. When the upward pressure of the air 802 is greater than the downward spring force, the valve body 840 will move upward until enough air 804 is released by the valve 800 such that the upward force applied to the plate 842 by the pressure of the remaining internal air 841 is overcome by the downward force applied to the plate 842 by the spring 860. The valve body 840 may thus move axially up and down in such manner.

The clamping interface 813 may be located between the housing 820 and the base 810, e.g. between the flange 822 of the housing 820 and the flange 812 of the base 810. The envelope 710 of the airbag 705, e.g. an inward edge 711 thereof, may be secured within the interface 813, as shown for example on the left side of the valve 800 in FIG. 3C. The opposite right side of the valve 800 may also clamp the envelope 710, but is not shown for clarity. The flanges 812, 822 may compress the envelope 710 therebetween. The inward edge 711 may form an annular opening in the envelope 710 as described and extend annularly around the clamping interface 813. The envelope 710 may have the radially inward edge 711 of the openings that are received into the valves 800, where such edge 711 extends into the housing 820. In some embodiments, the inward edge 711 of the envelope 710 may be secured between a radially inward surface of the flange 822 and/or sidewall 824, and a radially outward surface of the upward protrusion 815. The fasteners 832 may penetrate the envelope 710, e.g. at or near the edge 711. Further, the clamping interface 813 may or may not include seals therein.

As further shown in FIG. 3C, the valve 800 may have an overall axial height H1 and overall width W1. The width W1 may be perpendicular to the height H1. The valve 800 may extend axially outward from the clamping interface 813 a distance of H2. The height H1 may extend from a lower end of the base 810, e.g. a lower end of the flange 812, to an upper end of the housing 820, e.g. an upper end of the radial webs 828. W1 may extend between diametrically opposed radial outer edges of the housing 820, e.g. radial outer edges of the flange 822. In some embodiments, W1 may extend between diametrically opposed radial outer edges of the base 810, e.g. radial outer edges of the flange 812, such as radial outer edges of the radial portion 814.

Various features as described herein may allow for a low profile, or minimal heights H1 and H2, and/or a wider footprint, or larger width W1, of the valve 800. The larger width W1 may allow for the height H1 to be smaller. The wider footprint, or larger width of W1 may allow for a comparable flow rate without the necessity of a tall valve with a large deflection distance by providing additional flow area. In some embodiments, the overall height H1 may be from about 2.5 in to about 3 in. In some embodiments, the height H2 may be from about 2.25 in to about 2.75 in. In some embodiments, the overall width W1 may be from about 3 in to about 6 in.

The valve 800 may have an aspect ratio defined as the ratio of the overall width W1 to the overall height H1. The aspect ratio may be between about 1 to about 2.4.

The valve 800 may be calibrated to have a controlled and fixed vent rate of the air 804 to maintain a constant pressure in envelope 710. In some embodiments, the valve 800 may be calibrated by adjusting the spring compression force provided by the conical spring 860. This in turn may calibrate the pressure at which the air bag will be vented by the check valve.

The valve 800 may be assembled prior to or during installation with the airbag 705. The valve 800 may be assembled in a matter of a few minutes. The valve 800 may be attached to the envelope 710, by placing the envelope 710 inner edge 711 within the clamping interface 813, and tightening the fasteners 832 to compress the envelope 710 between the flanges 812, 822. In some embodiments, the housing 820 and valve body 840 may be assembled together as a subassembly which is then attached to the base 810. The base 810 may be positioned within the interior of the envelope 710, and then the housing 820 and valve body 840 subassembly attached thereto as described. With the valves 800 attached to the airbag 705, air may be supplied to the interior of the envelope 710, e.g. using the compressor 612 and tank 616. In some embodiments, the valve 800 may only require three manufactured parts, i.e. the base 810, the plate 842, and the housing 820, with the remaining parts being commercial, off the shelf parts.

Scope and Terminology

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

Any methods or flow chart sequences either shown or described are illustrative only. A person of skill in the art will understand that the steps, decisions, and processes embodied in the methods described or shown herein may be performed in an order other than that described herein. Thus, the particular flowcharts and descriptions are not intended to limit the associated processes to being performed in the specific order described.

As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to." the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An airbag decelerator system comprising:
an airbag comprising an envelope defining an interior volume configured to store pressurized air; and
a valve comprising:
    a base having a first annular flange defining an opening;
    a housing comprising:
        a second annular flange,
        a sidewall defining a first plurality of openings, and
            an upper portion extending across an upper end of the sidewall, the upper portion located axially upward from the second annular flange and defining a second plurality of openings, wherein the first and second annular flanges clamp therebetween a portion of the envelope to secure the valve to the airbag;

a spring configured to axially compress and lengthen;

a guide coupled with the upper portion of the housing and protruding toward the base; and a valve body supported inside the housing and biased toward the base by the spring to seal the opening and prevent the pressurized air from escaping the interior volume of the airbag to an exterior of the airbag, a portion of the valve body configured to be received by the guide, and wherein the spring is configured to compress upon impact between the airbag and a ground surface such that the valve body unseals the opening to allow the pressurized air to escape the interior volume of the airbag to the exterior of the airbag, and wherein the first plurality of openings is configured to allow air to exit the housing via the sidewall and the second plurality of openings is configured to allow air to exit the housing via the upper portion upon impact between the airbag and the ground surface.

2. The system of claim 1, wherein the spring is conical.

3. The system of claim 2, wherein a wide portion of the conical spring faces away from the housing.

4. The system of claim 1, wherein the valve body comprises a planar plate moveably axially supported by a stem that extends through the spring.

5. The system of claim 4, wherein the stem comprises a threaded longitudinal member and the guide surrounds at least a portion of the stem.

6. The system of claim 5, wherein the guide is a bushing, wherein the bushing comprises polytetrafluoroethylene (PTFE).

7. The system of claim 1, wherein the housing is additively manufactured.

8. The system of claim 1, wherein the valve has a maximum height of 3 inches.

9. The system of claim 1, wherein the spring is configured to compress in response to a pressure of the pressurized air exceeding a threshold.

10. The system of claim 9, wherein the threshold is 10 pounds per square inch (psi).

11. A valve for an airbag decelerator system, the valve comprising:

a base having a first annular flange defining an opening;

a housing comprising:

a second annular flange, a sidewall defining a first plurality of openings, and an upper portion extending across an upper end of the sidewall, the upper portion located axially upward from the second annular flange and defining a second plurality of openings, wherein the first and second annular flanges are configured to clamp therebetween a portion of an airbag fabric to secure the valve to an airbag;

a spring configured to axially compress and lengthen;

a guide coupled with the upper portion of the housing and protruding toward the base; and a valve body supported inside the housing and biased toward the base by the spring to seal the opening, a portion of the valve body configured to be received by the guide, wherein the spring is configured to compress upon impact between the airbag decelerator system and a ground surface such that the valve body unseals the opening, and wherein the first plurality of openings is configured to allow air to exit the housing via the sidewall and the second plurality of openings is configured to allow air to exit the housing via the upper portion upon impact between the airbag decelerator system and the ground surface.

12. The valve of claim 11, wherein the spring is conical.

13. The valve of claim 12, wherein a wide portion of the conical spring faces the opening.

14. The valve of claim 11, wherein the valve body is supported by a longitudinal member that is received by the guide.

15. The valve of claim 11, wherein the housing is additively manufactured.

16. The valve of claim 11, wherein the valve has a maximum overall axial height H1 of 3 inches.

17. The valve of claim 11, wherein the spring has a spring constant of between about 3 lbf/in to about 8 lbf/in.

18. The valve of claim 11, wherein the guide is positioned within a bore of the housing, the guide configured to move with respect to the housing.

19. The valve of claim 11, further comprising a plurality of radial webs protruding from an outer surface of the upper portion of the housing.

20. A high altitude platform comprising:

a lighter than air system configured to lift a payload off a ground to an altitude above 50,000 feet; and an airbag decelerator system configured to provide cushioning to the payload upon returning to ground, the airbag decelerator system comprising:

an airbag comprising an envelope defining an interior volume configured to store pressurized air; and a valve comprising:

a base having a first annular flange defining an opening;

a housing comprising:

a second annular flange, a sidewall defining a first plurality of openings, and an upper portion extending across an upper end of the sidewall, the upper portion located axially upward from the second annular flange and defining a second plurality of openings, wherein the first and second annular flanges clamp therebetween a portion of the envelope to secure the valve to the airbag;

a spring configured to axially compress and lengthen;

a guide coupled with the upper portion of the housing and protruding toward the base; and a valve body supported inside the housing and biased toward the base by the spring to seal the opening and prevent the pressurized air from escaping the interior volume of the airbag to an exterior of the airbag, a portion of the valve body configured to be received by the guide, and wherein the spring is configured to compress upon impact between the airbag and a ground surface such that the valve body unseals the opening to allow the pressurized air to escape the interior volume of the airbag to the exterior of the airbag, wherein the first plurality of openings is configured to allow air to exit the housing via the sidewall and the second plurality of openings is configured to allow air to exit the housing via the upper portion upon impact between the airbag and the ground surface.

21. The high altitude platform of claim 20, wherein the spring is conical.

22. The high altitude platform of claim 20, wherein the housing is additively manufactured.

23. The high altitude platform of claim 20, wherein the valve body is supported by a longitudinal member extending through the guide.

24. The high altitude platform of claim 20, wherein the valve has a maximum height of 3 inches.

\* \* \* \* \*